United States Patent
Jermann et al.

(10) Patent No.: US 8,704,437 B2
(45) Date of Patent: Apr. 22, 2014

(54) PHOSPHOR MIXTURE FOR A DISCHARGE LAMP AND A DISCHARGE LAMP

(75) Inventors: Frank Jermann, Königsbrunn (DE); Armin Konrad, Großaitingen (DE); Martin Zachau, Geltendorf (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 0 days.

(21) Appl. No.: 12/452,159

(22) PCT Filed: Jul. 9, 2008

(86) PCT No.: PCT/EP2008/058913
§ 371 (c)(1),
(2), (4) Date: Dec. 17, 2009

(87) PCT Pub. No.: WO2009/010433
PCT Pub. Date: Jan. 22, 2009

(65) Prior Publication Data
US 2010/0141114 A1  Jun. 10, 2010

(30) Foreign Application Priority Data
Jul. 16, 2007  (DE) .......................... 10 2007 033 029

(51) Int. Cl.
*H01J 63/04* (2006.01)
(52) U.S. Cl.
USPC ...................... 313/487; 313/486; 252/301.4 F
(58) Field of Classification Search
None
See application file for complete search history.

(56) References Cited

U.S. PATENT DOCUMENTS

| | | | |
|---|---|---|---|
| 5,049,779 A * | 9/1991 | Itsuki et al. .................. 313/486 |
| 5,422,538 A | 6/1995 | Ouwerkerk et al. |
| 5,714,836 A | 2/1998 | Hunt et al. |
| 7,030,549 B2 | 4/2006 | Dutta |
| 7,119,488 B2 | 10/2006 | Soules et al. |
| 7,538,495 B2 | 5/2009 | Wada et al. |
| 7,696,685 B2 | 4/2010 | Yamakawa |
| 7,696,694 B2 | 4/2010 | Vossen et al. |
| 2004/0095058 A1 | 5/2004 | Dutta |
| 2004/0113539 A1 | 6/2004 | Soules et al. |
| 2007/0132360 A1 | 6/2007 | Hildenbrand et al. |

(Continued)

FOREIGN PATENT DOCUMENTS

CN  1672239 A  9/2005
EP  1 428 863 A1  6/2004

(Continued)

OTHER PUBLICATIONS

Japanese Office Action dated Mar. 7, 2012 issued in counterpart Japanese Application No. 2010-516463.

*Primary Examiner* — Britt D Hanley
(74) *Attorney, Agent, or Firm* — Holtz Holtz Goodman & Chick PC

(57) ABSTRACT

A phosphor mixture for a discharge lamp, which includes a first phosphor compound and a second phosphor compound, wherein the first phosphor compound has an emission spectrum in the green and/or yellow spectral range and absorbs the UV radiation emitted by an Hg source and the radiation in the blue spectral range emitted by the Hg source, characterized in that the first phosphor compound of the phosphor mixture comprises $(Ba,Sr,Ca)_2SiO_4{:}Eu$ and/or $(Sr_{1-x-y}Ba_xCa_y)Si_2O_2N_2{:}Eu$ (SrSiON), as a constituent, and the second phosphor compound of the phosphor mixture comprises $Y_2O_3{:}Eu$, as a constituent; and the phosphor mixture has a color temperature of less than 2500 K.

24 Claims, 5 Drawing Sheets

(56) References Cited

U.S. PATENT DOCUMENTS

| | | | |
|---|---|---|---|
| 2009/0091235 A1 | 4/2009 | Matsuo et al. | |
| 2009/0096958 A1 | 4/2009 | Matsuura et al. | |
| 2010/0102703 A1 | 4/2010 | Jermann et al. | |
| 2010/0102704 A1 | 4/2010 | Jermann et al. | |

FOREIGN PATENT DOCUMENTS

| | | |
|---|---|---|
| JP | 9-7545 A | 1/1997 |
| JP | 10-106494 A | 4/1998 |
| JP | 2000-067813 A | 3/2000 |
| JP | 2001-200249 A | 7/2001 |
| JP | 2003-234089 A | 8/2003 |
| JP | 2004-507040 A | 3/2004 |
| JP | 2005-008844 A | 1/2005 |
| JP | 2005-213288 A | 8/2005 |
| JP | 2006-098034 A | 4/2006 |
| JP | 2006-190658 A | 7/2006 |
| WO | WO 2005/045881 A1 | 5/2005 |
| WO | WO 2006/051768 A1 | 5/2006 |
| WO | WO 2006/095284 A1 | 9/2006 |
| WO | WO 2007/013688 A2 | 2/2007 |
| WO | WO 2007/054875 A1 | 5/2007 |
| WO | WO 2007/066733 A | 6/2007 |
| WO | WO 2007/111246 A1 | 10/2007 |

* cited by examiner

| Group | lumnous flux, [lm] | efficacy, [lm/W] | x | y | CRI | color temperature, [K] |
|---|---|---|---|---|---|---|
| L58 1H 90/10 Sr-SION:Eu 1% | 3285 | 87,0 | 0,561 | 0,368 | 78 | 1507 |
| L581H 75/25 Sr-SION:Eu 1% | 3203 | 84,5 | 0,525 | 0,410 | 82 | 1990 |
| L581H 50/50 Sr-SION:Eu 1% | 3016 | 81,1 | 0,465 | 0,476 | 85 | 3089 |
| L581H / CAT; comparison | 3246 | 86,8 | 0,477 | 0,416 | 83 | 2514 |

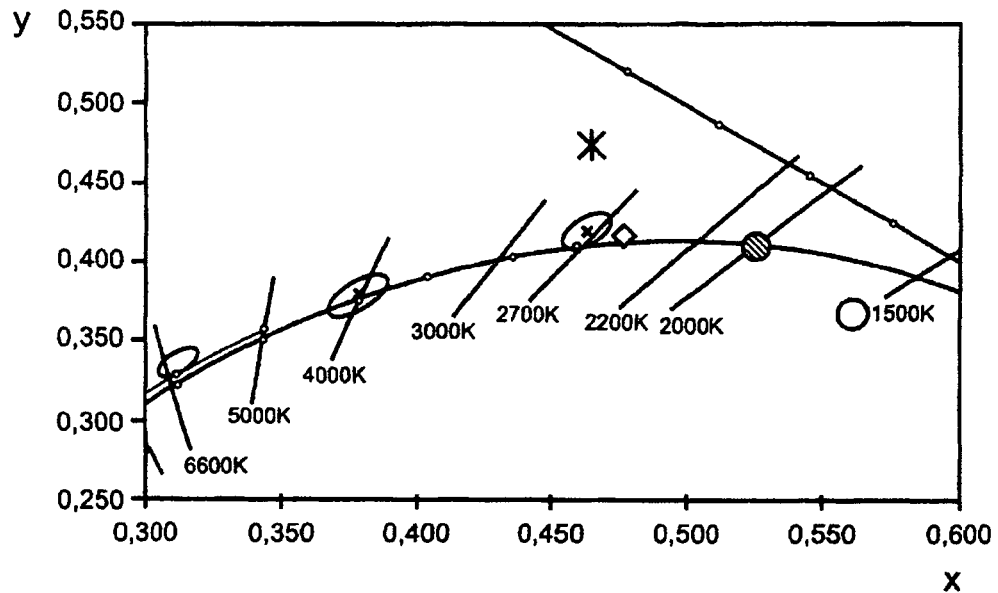
Fig.6
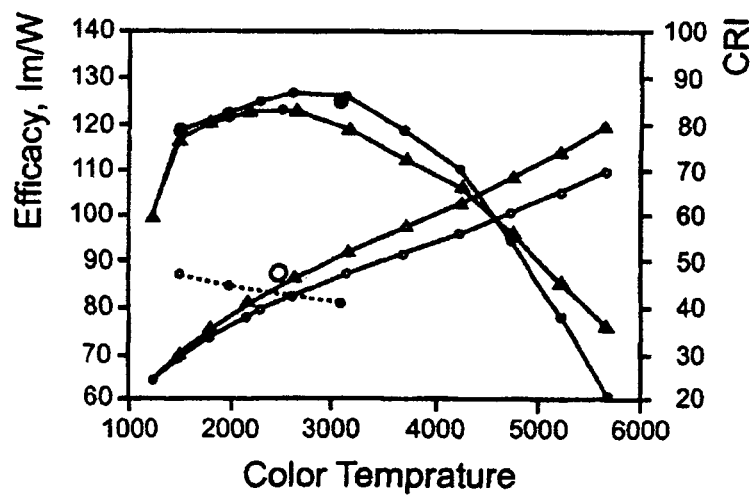
Fig.7
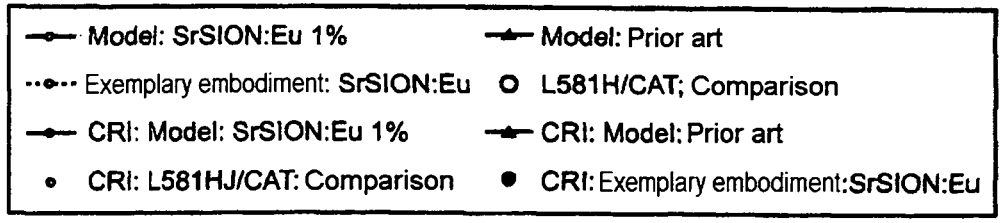

under 35 USC 371 of International Application PCT/EP2008/058913, filed. Jul. 9, 2008, which is incorporated herein in its entirety by this reference.

PHOSPHOR MIXTURE FOR A DISCHARGE LAMP AND A DISCHARGE LAMP

This application is a U.S. National Phase Application under 35 USC 371 of International Application PCT/EP2008/058913, filed. Jul. 9, 2008, which is incorporated herein in its entirety by this reference.

TECHNICAL FIELD

The invention relates to an phosphor mixture for a discharge lamp, which comprises a first phosphor compound and a second phosphor compound. The invention furthermore relates to a discharge lamp having such an phosphor mixture.

PRIOR ART

For the coating of low-pressure Hg discharge lamps, it is general practice to use a blue, red and green phosphor for radiation conversion, in order to be able to achieve color temperatures of more than 2500 K in the region of the Judd isotherms, for example within the standardized IEC color tolerance ranges. The phosphor mixtures conventionally used (BAM, CAT, YOE) for the most part convert the radiation generated by the low-pressure Hg discharge, with the wavelengths 185 nm and 254 nm, into visible light, while the radiation component additionally emitted in the visible range by the Hg discharge, for example at 435 nm, is not absorbed or is absorbed only slightly by the phosphors used.

An additional bluish Hg-Vis spectrum is therefore superimposed on the phosphor spectrum. The effect of this is that it is not possible to achieve all color loci of the color triangle which is covered by the phosphors excited in the UV (ultraviolet) range (wavelengths less than 254 nm).

Instead, the achievable color triangle is reduced and the vertices are displaced in the direction of the Hg-Vis color position. The. extent of the shift depends on the radiation component of the Hg-Vis radiation relative to the phosphor radiation, the Hg-Vis component increasing with an increasing discharge current and increasing current density in the discharge vessel of the lamp. Consequently, owing to the high Hg-Vis component in heavily loaded lamps, it is no longer possible to achieve color temperatures of 2700 K within the IEC tolerance range merely by mixing a green-emitting phosphor and a red-emitting phosphor. Furthermore, color temperatures of less than 2500 K in the region of the Judd isotherms cannot be achieved with contemporary phosphors.

In conventional lamps, a filter tube, which is fitted on the outside of the lamp bulb and is provided with dyes or pigments, is used to absorb the bluish Hg radiation. Filter layers may furthermore be provided inside the discharge vessel, these being arranged between the inner side of the lamp bulb and the phosphor layer. Colored, for example pigmented discharge vessels may furthermore be provided.

Furthermore, an phosphor L175, $Y_3Al_5O_{12}$:Ce,Tb, which emits in a yellow spectral range may for example be used for absorption of the radiation component, its radiation conversion into the longer-wavelength spectral range and its emission in this range, as a constituent of a coating outside the discharge vessels, for example in the tube material, or inside the discharge vessel between the discharge vessel and the phosphor coating.

Use of this phosphor in the phosphor layer, however, is less preferable owing to its low excitability in the UV range.

SUMMARY OF THE INVENTION

It is an object of the present invention to provide an phosphor mixture for a discharge lamp, and a discharge lamp, with which it is possible to achieve lower color temperatures ideally in the region of the Judd isotherms together with a higher luminous efficiency.

This object is achieved by a phosphor mixture which has the features as claimed herein, and by a discharge lamp which has the features as claimed herein.

An phosphor mixture according to the invention for a discharge lamp comprises a first phosphor compound and a second phosphor compound. The term phosphor compound is intended in particular to mean a compound of atoms which form an phosphor particle.

The first phosphor compound has an emission spectrum in the green and/or yellow spectral range and is designed to absorb the UV (ultraviolet) radiation emitted by an Hg source and the radiation in the blue spectral range emitted by the Hg source. Through this configuration of the phosphor mixture, lower color temperatures can be achieved owing to absorption of the bluish Hg radiation. Furthermore, a higher luminous efficiency can be ensured owing to absorption of the Hg radiation and longer-wavelength emission.

Owing to the property of the phosphor mixture, in particular of the first phosphor compound, that it can absorb and convert both the UV radiation and the radiation of the Hg source located in the blue spectral range, lower color temperatures compared with the prior art can be produced ideally in the region of the Judd isotherms.

Preferably, the dominant wavelength of the emission spectrum of the overall phosphor mixture is more than 540 nm, in particular more than 600 nm.

Measurements of the dominant wavelength (lambda_dom) of lamp specimens have shown that the data (measurement points) for compact fluorescent lamps (CFL) and tube lamps (FL) coincide very well.

The lamp emission spectrum generated by the phosphor mixture achieves dominant wavelengths in the following ranges:

Preferably, the dominant wavelength of the lamp emission spectrum of the overall phosphor mixture is more than 540 nm. In particular, for color temperatures of less than 2750 K it is more than 575 nm, for color temperatures of less than 2000 K it is more than 585 nm, for color temperatures of less than 1750 K it is more than 590 nm, and for those less than 1250 K it is more than 600 nm.

The dominant wavelength is determined in the CIE 1931 xy chromaticity diagram. It corresponds to the wavelength of the spectral color locus (boundary curve of the color diagram) at which the straight line through the white point at x=0.313 and y=0.337 and the measured color position x, y of the phosphor mixture intersects with the spectral color locus.

Particularly preferably, the phosphor mixture is designed so that the color temperature of the emitted radiation can be set as a function of an adjustable mass ratio between the first and second phosphor compounds. The mass fraction of the first phosphor compound is preferably less than or equal to 50%. In particular, the phosphor compound is designed so that color temperatures of less than 2500 K can be set. This can, in particular, be done by adjusting the mass ratios between the at least two phosphor compounds. Relatively low color temperatures can thus be produced by this configuration of the phosphor mixture, yet still with an increased luminous efficiency.

Preferably, the first phosphor compound has strong absorption for radiation with wavelengths of less than 440 nm. Here, strong absorption means that the reflection by a pressed powder tablet in 45°/0° geometry, measured relative to an $Al_2O_3$ standard, is less than 60%.

Preferably, the first phosphor compound has very strong absorption for radiation with wavelengths of about 254 nm. Here, very strong absorption means that the reflection by a pressed powder tablet in 45°/0° geometry, measured relative to an $Al_2O_3$ standard, is less than 40%.

In particular, the phosphor mixture is also designed so that the first phosphor compound has weak absorption for radiation with wavelengths of more than 530 nm. Weak absorption means that the reflection by a pressed powder tablet in 45°/0° geometry, measured relative to an $Al_2O_3$ standard, is more than 90%.

The emission spectrum of the first phosphor compound is preferably configured so that it has a dominant wavelength of between 530 nm and 570 nm.

In particular, the width at half maximum of the emission band of the first phosphor compound of the first phosphor compound is less than 100 nm.

Preferably, the first phosphor compound of the phosphor mixture comprises an orthosilicate. In particular, the orthosilicate is formed from the formula $(Ba,Sr,Ca)_2SiO_4$. Such a constituent of an phosphor compound particularly advantageously makes it possible to achieve the aforementioned criteria in respect of very strong, strong and weak absorption.

Another advantageous configuration of the phosphor mixture is obtained when the first phosphor compound comprises an phosphor from the class of nitrides or oxynitrides as a constituent, in particular $(Sr_{1-x-y}Ba_xCa_y)Si_2O_2N_2$:Eu which is abbreviated to SrSiON below. The criteria in respect of the aforementioned very strong, strong and weak absorption in the corresponding wavelength ranges can also be satisfied particularly advantageously by this specific constituent configuration of the first phosphor compound.

Preferably, the first phosphor compound of the phosphor mixture is doped with Eu (europium). The weight fraction of the Eu doping preferably lies between 0.1% and 15%. In particular, this doping proportion lies between 0.2% and 2%. Doping with between 1% and 2% Eu has proven particularly advantageous. In particular, this is preferably the case when the first phosphor compound is made of SrSiON:Eu.

Preferably, the second phosphor compound has an emission spectrum in the red spectral range. The second phosphor compound may also advantageously be doped with Eu. In particular the entire phosphor mixture is then doped with Eu, and all the phosphor compounds of the phosphor mixture are therefore doped with Eu.

The second phosphor mixture may preferably comprise $Y_2O_3$ as a constituent, in particular $Y_2O_3$:Eu.

Particularly preferably, the phosphor compounds orthosilicate:Eu or SrSiON:Eu can therefore make it possible to absorb the UV-Hg radiation as well as the bluish Hg-Vis radiation, while the specifically mentioned phosphor compounds have an emission spectrum in the green yellow spectral range. These said phosphor compounds are also distinguished by high excitability and efficiency in the UV spectral range as well as in the blue spectral range. Furthermore said Hg radiation components are not, or not for the most part, absorbed by these specific phosphor compounds but instead likewise for the most part converted into visible radiation, the dominant wavelength of the phosphor being more than 540 nm.

In particular, by combining one of the aforementioned advantageous first phosphor compounds with a second phosphor emitting in the red spectral range, in particular $Y_2O_3$:Eu, it is therefore particularly advantageously possible to achieve color temperatures of less than 2500 K with high efficiency.

It is possible for the phosphor mixture according to the invention and/or at least one of the advantageous embodiments to consist exclusively of the compositions respectively mentioned, and therefore for it to comprise no other chemical constituents. It is, however, also possible for this component specification not to be exclusive, but instead the phosphor mixture according to the invention and/or an advantageous embodiment thereof may furthermore also comprise other chemical constituents, in particular other phosphors.

It should be mentioned explicitly that all chemical formulae indicated for the phosphor mixture and the phosphor compounds refer to ideal formulae, and that all compounds extending beyond these ideal formulae with (minor) differences in stoichiometry are nevertheless explicitly covered as well by the invention. This applies in particular for differences in which the crystal structure remains the same and the differences in emission and absorption spectra differ in the peak position by less than 1%, and in the peak width by less than 5%.

The following specification may be given as ideal formulae for some other phosphors:

CAT refers to $(Ce,Tb)MgAl_{11}O_{19}$; LAP refers to $(La,Ce,Tb)PO_4$; BAM refers to $(Ba,Eu)MgAl_{10}O_{17}$; BAMMn refers to $(Ba,Eu)(Mg,Mn)Al_{10}O_{17}$; CBT refers to $(Gd,Ce,Tb)(Mg,Zn,Mn)B_5O_{10}$; SCAP refers to $(Sr,Ba,Ca,Mg,Eu)_5(PO_4)_3(F,Cl)$; SCAPm refers to $(Sr, Ba, Ca, Mg, Eu, Mn)_5(PO_4)_3(F,Cl)$; zinc silicate refers to $(Zn,Mg,Mn)_2SiO_4$; YOE refers to $Y_2O_3$:Eu.

Another application aspect of the invention relates to a discharge lamp having a discharge vessel, on which an phosphor layer is formed. At least a first phosphor layer is provided, which comprises an phosphor mixture according to the invention or an advantageous embodiment thereof.

Preferably, the first phosphor layer is formed directly on the inner side of the discharge vessel. It is also possible for at least one Hg diffusion protection layer to be formed between the first phosphor layer and the inner side of the discharge vessel. For example, such a protective layer may be formed between the inner side of the discharge vessel and a first phosphor layer, which comprises SrSiON:Eu as a first phosphor compound; This specific protective layer can fulfill the function in respect of Hg diffusion into the glass of the discharge vessel, which is to be avoided.

Preferably, a protective layer for protecting the first phosphor compound against VUV radiation and/or a reaction with Hg ions is formed on the upper side of the first phosphor layer facing away from the inner side of the discharge vessel. This protective layer for protecting against VUV radiation and/or a reaction of the phosphor compound with Hg ions may, for example, comprise $Al_2O_3$ and/or $Y_2O_3$ as a constituent. This radiation damage protection layer may also be applied directly onto the individual phosphor compounds of the phosphor layer, or enclose them. Here, VUV radiation refers to radiation with a wavelength of less than 200 nm.

It is also possible for a second phosphor layer, which comprises Tb (terbium), to be formed on the upper side of the first phosphor layer facing away from the inner side of the discharge vessel. Since the first phosphor layer is formed so that it is free of Tb and the second phosphor layer is formed so that it contains Tb, these two phosphor layers are designed as different layers at least owing to this difference in said element.

Preferably, this second phosphor layer comprises a CAT-YOE mixture of phosphors. CAT refers to a chemical compound which is essentially described by $CeMgAl_{11}O_{19}$:Tb, and YOE is essentially described by $Y_2O_3$:Eu. Besides CAT, it is also possible to provide LAP and/or CBT and/or zinc silicate as an alternative green phosphor.

Preferably, the first phosphor compounds of the first phosphor layer are enclosed by a protective layer. The material components of the protective layer are preferably different to the first phosphor compounds.

It is also possible for the protective layer enclosing the first phosphor compounds to comprise metal oxides. These may for example be $Al_2O_3$, $Y_2O_3$ or $SiO_2$. It is also possible for the protective layer enclosing the first phosphor compounds to comprise borates and/or phosphates. It is also possible for the protective layer enclosing the first phosphor compounds to comprise ternary materials, for example aluminum borates and aluminum phosphates. Metal oxides or a material with a positive surface charge in water are generally to be preferred, since they tend to reduce the Hg adsorption. $Al_2O_3$ and $Y_2O_3$ are therefore particularly highly suitable. On the other hand protective layers for the first phosphor compounds may also be produced from $SiO_2$; these compounds can be made particularly leaktight and thin and produced particularly economically, and they contribute to an improvement of the radiation stability and the water stability so that they can also be used despite a lower surface charge and a tendency to higher Hg adsorption.

This protective layer may also comprise fluorides.

Owing to this so-called coating of the first phosphor compound or the phosphor particles of the phosphor mixture, use in fluorescent and compact fluorescent lamps can make a positive contribution in respect of stability relative to exciting radiation, in respect of low affinity for Hg and therefore little adsorption of Hg during lamp operation, and in respect of increased stability in water, so that it is possible to use the currently conventional environmentally friendly coating methods in which a water-based suspension is used. This protective layer enclosing the phosphor particles or the first phosphor compounds is formed to be as leaktight and thin as possible, and therefore differs in its composition from the composition inside the phosphor particle or from the central composition. The composition of the surface may, for example, be determined by surface-sensitive methods such as XPS or SNMS. The central composition of the phosphor compound can be determined by volume-sensitive methods such as EDX, RFA, or alternatively by means of chemical analysis.

Preferably, such first phosphor compounds coated with a protective layer are used in the phosphor layer of the discharge lamp.

The discharge lamp is preferably designed as a low-pressure Hg discharge lamp.

By means of the phosphor mixture according to the invention or an advantageous embodiment thereof, it is generally possible to achieve color rendering indices in the range of 80. The luminous efficiency is comparable with contemporary light sources with much higher color temperatures in the range of 2700 K. For the same luminous efficiency, a color temperature of less than 2500 K can be achieved with the phosphor mixture according to the invention. Energy efficiency class A can also be achieved by this solution.

BRIEF DESCRIPTION OF THE DRAWINGS

Exemplary embodiments of the invention will be explained in more detail below with the aid of schematic drawings, in which:

FIG. 6 shows a CIE chromaticity diagram with a Planckian locus and isotemperature lines and color positions of specific embodiments of an phosphor mixture according to the invention;

FIG. 7 shows a diagram in which the expected efficiency is represented as a function of the color rendering;

FIG. 9 shows a diagram in which the remission curve of the exemplary embodiment, on which FIG. 8 is based, of the phosphor mixture according to the invention is shown.

PREFERRED EMBODIMENT OF THE INVENTION

Figure 1:
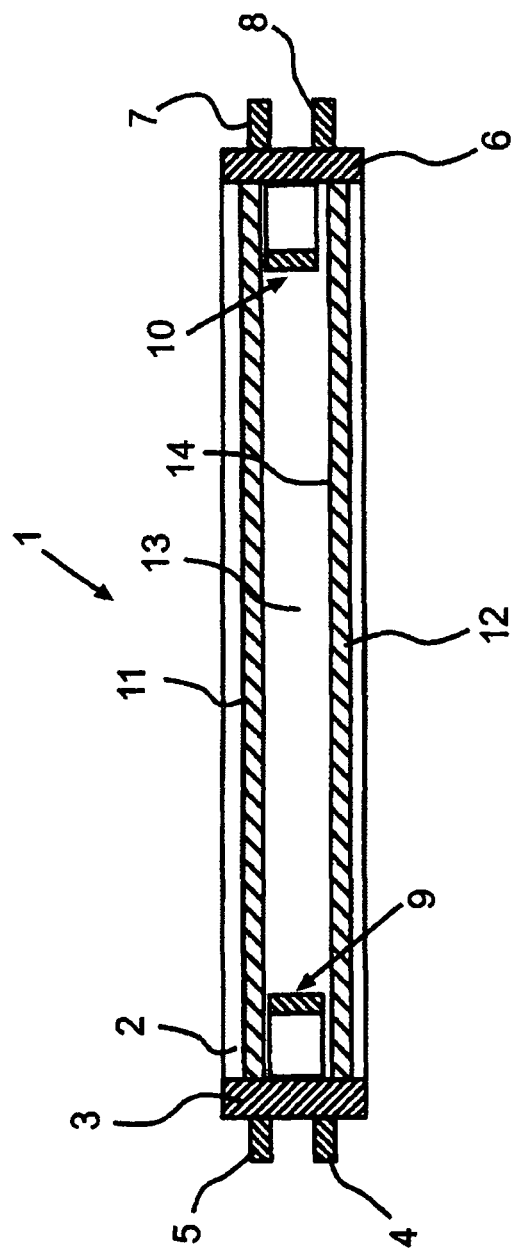
FIG. 1 shows a sectional representation of an exemplary embodiment of a discharge lamp according to the invention.

FIG. 1 shows a schematic sectional representation of a discharge lamp 1, which is designed as a low-pressure Hg discharge lamp. The discharge lamp 1 has a linear design and comprises a tubular discharge vessel 2, which is a glass bulb. A cap 3, which has electrical contacts 4 and 5 extending outward, is fitted on one end of the discharge vessel 2. A cap 6, to which outwardly extending contacts 7 and 8 are fastened, is likewise arranged on the opposite side of the discharge vessel 2. These electrical contacts 7 and 8 are electrically connected via electrical leads to an electrode 10, which extends into the discharge space 13 of the discharge vessel 2. Correspondingly, the electrical contacts 4 and 5 are connected to electrical leads which are connected to another electrode 9, this electrode 9 also extending into the discharge space 13 of the discharge vessel 2.

An phosphor layer 12 is formed on an inner side 11 of the discharge vessel 2, and in the exemplary embodiment it extends over the entire length of the discharge vessel 2. The phosphor layer 12 in the exemplary embodiment is formed directly on the inner side 11. Only the phosphor layer 12 is represented in the embodiment shown, although another layer may also be formed on the upper side 14 facing toward the discharge space 13 and therefore on the upper side 14 facing away from the inner side 11 of the discharge vessel 2. This may for example be a protective layer, in particular for the first phosphor compounds or phosphor particles of the phosphor layer 12.

Another phosphor layer may likewise be formed on this upper side 14. Another layer may likewise be arranged and formed between the phosphor layer 12 and the inner side 11.

The phosphor compounds are preferably enclosed by a protective layer of metal oxides, a borate, a phosphate or a ternary material.

The phosphor layer 12 comprises an phosphor mixture, having a multiplicity of first and a multiplicity of second phosphor compounds or phosphor particles. A first phosphor compound has an emission spectrum in the green to yellow spectral range, and is furthermore designed to absorb the UV radiation emitted by the Hg source and the radiation in the blue spectral range emitted by the Hg source. A first phosphor compound is furthermore designed to convert the absorbed UV radiation and the radiation in the blue spectral range into its emission spectrum. The term Hg source is intended for example to mean an Hg atom or an Hg ion, which is located in the discharge space 13. By emission of the electrodes from an electrode 9 or 10, the Hg sources in the discharge space 13 are excited and emit UV radiation as well as radiation in the blue spectral range.

The first phosphor compound in the exemplary embodiment is preferably SrSiON:Eu, so that the absorption of the Hg radiation components and the conversion of this radiation into visible radiation can take place particularly efficiently. The dominant wavelength of the phosphor mixture is more than 450 nm.

Preferably, the phosphor mixture in the phosphor layer 12 comprises a second phosphor compound which has an emission spectrum in the red spectral range. In particular, $Y_2O_3$:Eu is provided as the second phosphor compound, in which case color temperatures of less than 2500 K can be achieved with high efficiency through the combination of the phosphor compounds.

Furthermore, different color temperatures can be set by varying the mass ratios between the two phosphor compounds of the phosphor mixture. The mass fraction of the constituent SrSiON, expressed in terms of a total mass of 100 of the phosphor mixture, is always less than or equal to 50%.

Another preferred embodiment of the first phosphor compound is formed by orthosilicate:Eu, in particular $(Ba,Sr,Ca)_2SiO_4$:Eu. The phosphor particles or the phosphor compounds of the phosphor mixture may be coated with a protective layer, to which end a protective layer that is as leaktight and thin as possible will be formed. The stability relative to the exciting radiation can be improved by such application of a protective layer. Furthermore, the stability in water can also be improved and it is possible to achieve lower affinity for Hg and therefore less adsorption of Hg during lamp operation.

With such a configuration of the discharge lamp 1, particularly in respect of the phosphor mixture, it is possible to produce a color temperature of less than 2500 K even in the region of the Judd isotherms. General color rendering in the range of 80 can be achieved, the luminous efficiency being comparable with contemporary light sources at 2700 K. Energy efficiency class A can be achieved by the discharge lamp 1 shown in FIG. 1.

It is possible for the phosphor layer 12 to be arranged directly on the inner side 11 of the discharge vessel 2 and, in particular, for it as an phosphor mixture to comprise $Y_2O_3$:Eu as a second phosphor compound and SrSiON:Eu as a first phosphor compound.

Preferably, the first phosphor compound is designed so that it absorbs very strongly at a wavelength of 254 nm, at which the main intensity of the low-pressure Hg discharge is emitted, absorbs strongly at wavelengths of less than 440 nm and absorbs, weakly in the wavelength range of more than 530 nm. The phosphor compound is furthermore designed so as to provide green emission with a dominant wavelength of between 500 nm and 565 nm.

Figure 2:
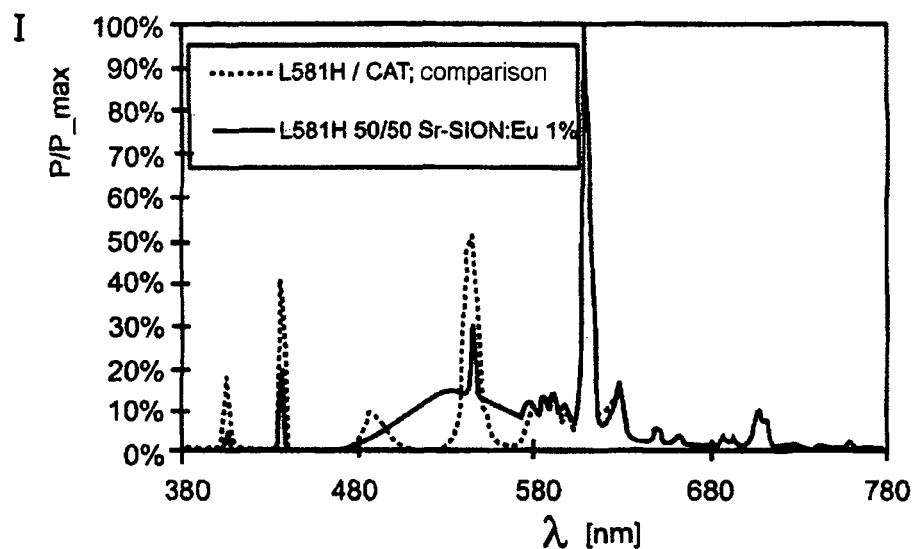
FIG. 2 shows an emission spectrum of a discharge lamp having phosphor mixtures according to the prior art, in comparison with an exemplary embodiment of an phosphor mixture according to the invention having a specific mixing ratio in relation to the total mass of the phosphor mixture.

FIG. 2 shows a diagram in which the percentage emission intensity is represented as a function of the wavelength λ. The emission spectrum shown in FIG. 2 is that of a discharge lamp according to FIG. 1. The dashed line shows an emission spectrum of the discharge lamp 1, which is designed according to the prior art and therefore comprises an phosphor layer which comprises $Y_2O_3$:Eu (L581H) and CAT as phosphor compounds.

In FIG. 2, the solid line furthermore shows the emission spectrum of a discharge lamp 1 according to the invention corresponding to FIG. 1, in which the phosphor layer 12 comprises an phosphor mixture according to the invention. In the emission spectrum according to FIG. 2, this phosphor mixture is made of $Y_2O_3$:Eu (L581H) as a second phosphor compound and SrSiON:Eu as a first phosphor compound. The mixing ratio of the two phosphor compounds in said specific exemplary embodiment of an phosphor mixture according to the invention is in each case 50% (50/50) of the total mass of the phosphor mixture. In the exemplary embodiment, the first phosphor compound is doped with Eu, the mass fraction or weight fraction of Eu being 1%. The 50/50 mass fractions are expressed in terms of a total mass of 100.

Figure 3:
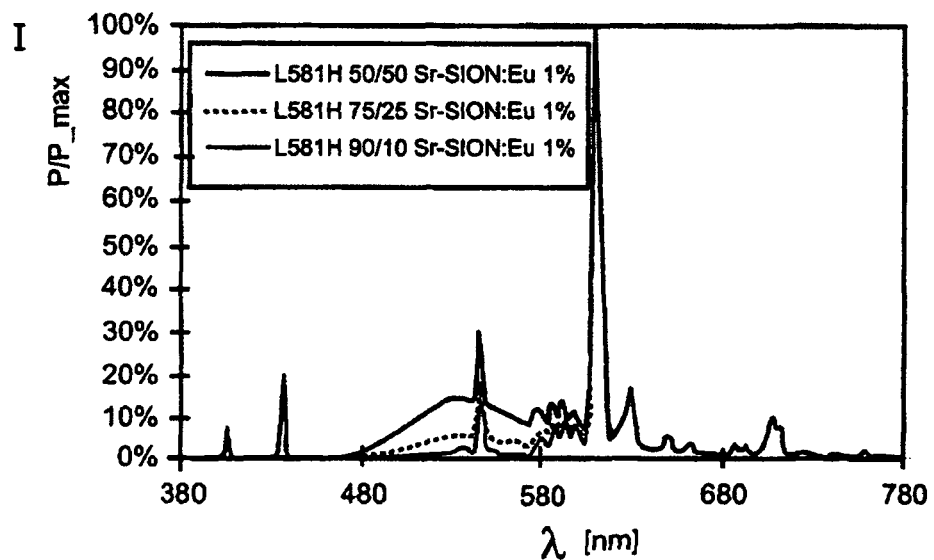
FIG. 3 shows an emission spectrum of phosphor mixtures according to the invention with different mass ratios between the first and second phosphor compounds.

FIG. 3 shows a diagram in which the percentage emission intensity I is represented as a function of the wavelength λ. The diagram according to FIG. 3 shows emission spectra of various exemplary embodiments of an phosphor mixture according to the invention, with different mass ratios between the two phosphor compounds of the phosphor mixtures. As may be seen in the diagram, phosphor mixtures are represented with their emission spectrum, the mass distributions between the second phosphor compound $Y_2O_3$:Eu (L581H) and the first phosphor compound SrSiON:Eu being 50% to 50% (50/50), 75% to 25% (75/25) and 90% to 10% (90/10). The emission spectra of the aforementioned three different embodiments of the phosphor mixture according to the invention are shown in the stated order by the thick solid line, by the dashed line and by the thin solid line.

Figures 4, 5:
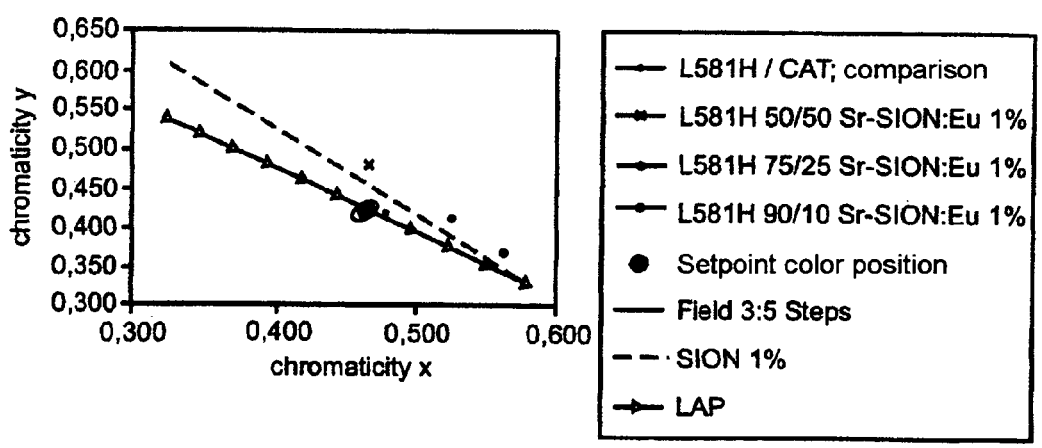
FIG. 4 shows photoelectrical values of a discharge lamp having an phosphor mixture according to the prior art, on the one hand, and exemplary embodiments of phosphor mixtures according to the invention on the other hand.
FIG. 5 shows a diagram in which the chromaticity or the standard tristimulus components of different phosphor mixtures are shown.

The table according to FIG. 4 shows the photoelectrical values for a discharge lamp 1 according to FIG. 1, designed as a T8L36W tube lamp. The first three rows show photoelectrical values for this discharge lamp 1 when the phosphor layer 12 respectively comprises the different embodiments of the phosphor mixture according to the invention. In comparison with this, the final, fourth row of the table according to FIG. 4 gives an indication of the photoelectrical values when this said discharge lamp 1 is formed with an phosphor known from the prior art in the phosphor layer.

FIG. 5 shows a diagram which represents the chromaticity xy or the standard tristimulus value components of different phosphor mixtures according to various embodiments of the phosphor mixture according to the invention, on the one hand, and phosphor mixtures known from the prior art on the other hand. The diagram represents color positions (solid lines) to be expected with a two-component mixture by superposition. The absorption and radiation conversion of the Hg radiation with a wavelength of less than 450 nm by the first phosphor compound, comprising the constituent SrSiON, of the phosphor mixture is not taken into account in this diagram. The color positions determined experimentally for a T8L36W tube lamp with the different phosphor mixtures are shown in the diagram. The color position shift to higher x values, achieved by absorption of the bluish Hg-Vis radiation, can be seen clearly. Lower color temperatures are therefore achieved.

FIG. 6 shows a CIE 1931 xy chromaticity diagram with a Planckian locus and isotemperature lines. Color positions of SrSiON and YOE phosphor mixtures from the diagram according to FIG. 5 are indicated. Color temperatures of less than 2500 K can be achieved in the region of the Judd isotherms. The prior art is represented as a rhombus at the color temperature 2514 K.

FIG. 7 shows a diagram in which the expected efficiency is shown as a function of the color temperature of different phosphor mixtures. The diagram shows efficiencies expected with a two-component mixture by superposition and general color rendering indices (solid lines). The radiation conversion of the Hg radiation, between a wavelength of 300 nm and less than 450 nm, by the constituent SrSiON of the first phosphor compound is not taken into account here.

The efficiency and color rendering indices, determined experimentally for a T8L36W tube lamp, corresponding to phosphor mixtures from the prior art (CAT/L581H) and exemplary embodiments of phosphor mixtures according to the invention (SrSiON/L581H) are plotted. A match of efficiency and color rendering is found for the phosphor mixture known from the prior art (CAT/L581H). This is shown by the dark point in the diagram with an efficiency of about 87 and a color temperature of about 2600 K. SrSiON exhibits an increase in efficiency with a decreasing color temperature, which can be achieved by successful radiation conversion of the Hg radiation in the range between the wavelengths 300 nm and 450 nm. The color rendering lies in the range of 80 which is relevant to applications in general lighting, and is correctly reproduced by the calculations. The advantage of high efficiency in the range of lower color temperatures is therefore obtained in comparison with the prior art.

Figure 8:
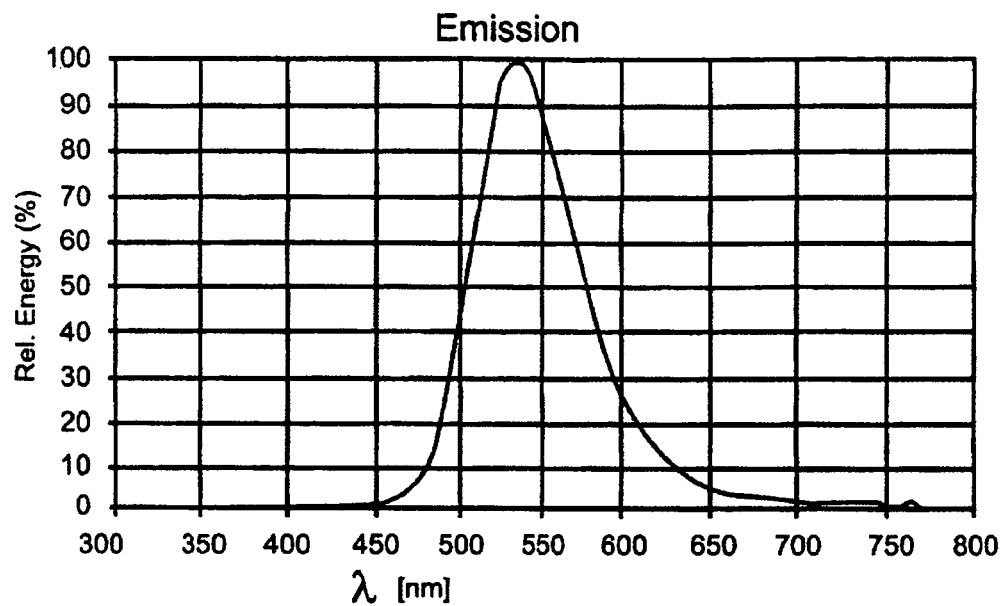
FIG. 8 shows an emission spectrum of a specific embodiment of an phosphor mixture according to the invention after excitation at a wavelength of 254 nm.

FIG. 8 shows a diagram in which the relative energy in percent is shown as a function of the wavelength λ of the first phosphor compound SrSiON:Eu(1%) of an phosphor mixture after excitation by Hg radiation with a wavelength of 254 nm. The phosphor mixing in this case is 50% to 50% between the first and second phosphor compounds.

Figure 9:
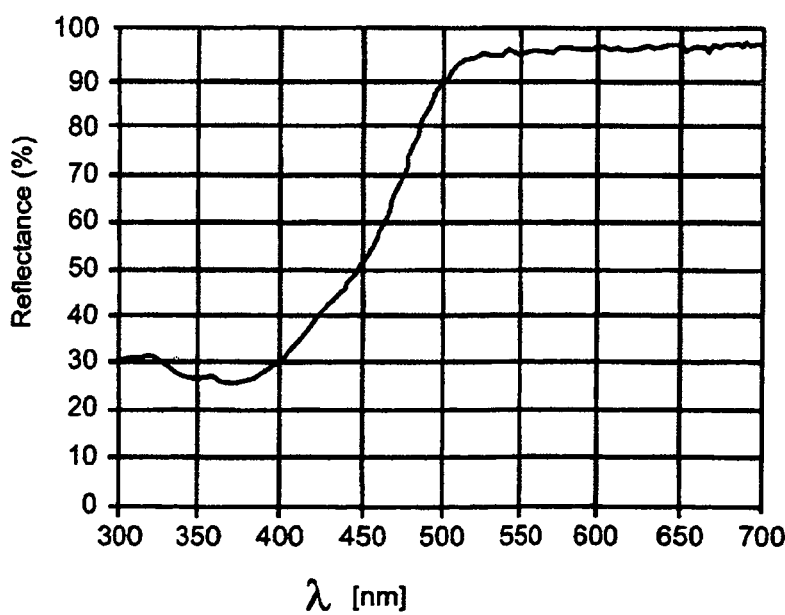

FIG. 9 shows a diagram in which the emission curve of the first phosphor compound, formed as SrSiON:Eu(1%), is shown as a function of the wavelength. This is also based on a mass ratio of 50% to 50% between the first and second phosphor compounds of the phosphor mixture.

In the simplified representation of a discharge lamp 1 according to FIG. 1, the phosphor layer 12 is applied directly on the inner side 11 of the discharge vessel 2. Further phosphor layers or other additional layers, for example protective layers or the like, are not shown in the diagram.

It is, however, also possible for the discharge vessel 2 to comprise at least one additional further coating. In this case, at least one additional coating may be formed between the inner side 11 of the discharge vessel 2 and the first phosphor layer 12. This intermediate layer is preferably designed as a layer protecting against Hg diffusion into the glass of the discharge vessel 2.

In addition to or instead of this, at least two first phosphor layers 12 may be formed on the discharge vessel 2.

Starting from the representation according to FIG. 1, it is also possible for a further layer to be formed on the upper side 14 of the first phosphor layer 12. This further layer, facing toward the discharge space 13, may likewise be a protective layer which protects the phosphor compounds of the first phosphor layer 12 for protection against radiation damage in the VUV spectral range or against reactions with Hg ions. A corresponding coating may also be applied directly onto the individual phosphor compounds or phosphor particles of the phosphor mixture of the first phosphor layer 12. For example, such a radiation damage protection layer and/or reaction prevention protective layer may be formed as $Al_2O_3$ or $Y_2O_3$.

In addition to or instead of this, it is possible for at least one first phosphor layer 12 comprising an phosphor mixture according to the invention to be formed on the discharge vessel 2, in which case an additional second phosphor layer (not shown) which comprises Tb (terbium) as a constituent may be applied between the discharge space 13 and this first phosphor layer 12. In particular, the first phosphor layer may be an phosphor mixture according to the invention formed without Tb. The second phosphor layer may, for example, comprise an phosphor mixture of the phosphor compounds CAT and YOE.

All the explained exemplary embodiments may also be combined with one another in any desired way, so that a very wide variety of layer formations and configurations of the individual phosphor layers and protective layers can be obtained.

The invention claimed is:

1. A phosphor mixture for a discharge lamp, which comprises phosphor compounds, said phosphor compounds consisting of a first phosphor compound and a second phosphor compound, wherein the first phosphor compound has an emission spectrum consisting in the green and/or yellow spectral range and absorbs UV radiation emitted by an Hg source and radiation in the blue spectral range emitted by the Hg source, wherein the first phosphor compound of the phosphor mixture comprises $(Ba,Sr,Ca)_2SiO_4$:Eu and/or $(Sr_{1-x-y}Ba_xCa_y)Si_2O_2N_2$: Eu(SrSiON), as a constituent; the second phosphor compound of the phosphor mixture comprises $Y_2O_3$:Eu, as a constituent, and has an emission spectrum consisting in the red spectrum range;
   wherein the phosphor mixture has a color temperature of less than 2500 K; wherein the mass fraction of the first phosphor compound is less than or equal to 50%; and wherein the dominant wavelength of the phosphor mixture is more than 575 nm.

2. The phosphor mixture as claimed in claim 1, characterized in that the first phosphor compound will convert the absorbed UV radiation and the radiation in the blue spectral range into its emission spectrum.

3. The phosphor mixture as claimed in claim 1, characterized in that the emitted radiation of the phosphor mixture can be set as a function of an adjustable mass ratio between the first and second phosphor compounds.

4. The phosphor mixture as claimed in claim 1, characterized in that the first phosphor compound has a strong absorption for radiation with wavelengths of less than 440 nm such that the reflection by a pressed powder tablet in 45°/0° geometry, measured relative to an $Al_2O_3$ standard, is less than 60%.

5. The phosphor mixture as claimed in claim 1, characterized in that the first phosphor compound has a very strong absorption for radiation with wavelengths of about 254 nm such that the reflection by a pressed powder tablet in 45°/0° geometry, measured relative to an $Al_2O_3$ standard, is less than 40%.

6. The phosphor mixture as claimed in claim 1, characterized in that the first phosphor compound has a weak absorption for radiation with wavelengths of more than 530 nm such that the reflection by a pressed powder tablet in 45°/0° geometry, measured relative to an $Al_2O_3$ standard, is more than 90%.

7. The phosphor mixture as claimed in claim 1, characterized in that the emission spectrum of the first phosphor compound has a dominant wavelength of between 530 nm and 570 nm.

8. The phosphor mixture as claimed in claim 1, characterized in that the width at half maximum of the emission band of the first phosphor compound is less than 100 nm.

9. A discharge lamp comprising a discharge vessel on which a first phosphor layer is formed, the first phosphor layer comprises the phosphor mixture as claimed in claim 1.

10. The discharge lamp as claimed in claim 9, characterized in that the first phosphor layer is formed directly on an inner side of the discharge vessel.

11. The discharge lamp as claimed in claim 9, further comprising at least one Hg diffusion protection layer which is formed between the first phosphor layer and an inner side of the discharge vessel.

12. The discharge lamp as claimed in claim 9, further comprising a protective layer for protecting the first phosphor compound against VUV radiation and/or a reaction with Hg ions is formed on an upper side of the first phosphor layer facing away from an inner side of the discharge vessel.

13. The discharge lamp as claimed in claim 12, characterized in that the protective layer comprises $Al_2O_3$ and/or $Y_2O_3$ as a constituent.

14. The discharge lamp as claimed in claim 9, further comprising a second phosphor layer, which comprises Tb, and is formed on an upper side of the first phosphor layer facing away from an inner side of the discharge vessel.

15. The discharge lamp as claimed in claim 14, characterized in that the second phosphor layer comprises a CAT-YOE mixture.

16. The discharge lamp as claimed in claim 9, further comprising a protective layer which encloses the first phosphor compound of the first phosphor layer.

17. The discharge lamp as claimed in claim 16, characterized in that material components of the protective layer are different than the first phosphor compound.

18. The discharge lamp as claimed in claim 17, characterized in that the protective layer enclosing the first phosphor compound comprises metal oxides.

19. The discharge lamp as claimed in claim 16, characterized in that the protective layer enclosing the first phosphor compound comprises borates and/or phosphates.

20. The discharge lamp as claimed in claim 16, characterized in that the protective layer enclosing the first phosphor compound comprises fluorides.

21. The discharge lamp as claimed in claim 16, characterized in that the protective layer enclosing the first phosphor compound comprises $SiO_2$.

22. The discharge lamp as claimed in claim 9, which is designed as a low-pressure Hg discharge lamp.

23. The phosphor mixture as claimed in claim 1, characterized in that the dominant wavelength of the emission spectrum of the overall phosphor mixture is more than 600 nm.

24. The phosphor mixture as claimed in claim 1, wherein the color temperature is less than 2000 K and the dominant wavelength is more than 585 nm.

* * * * *

UNITED STATES PATENT AND TRADEMARK OFFICE
CERTIFICATE OF CORRECTION

PATENT NO.        : 8,704,437 B2                                    Page 1 of 1
APPLICATION NO.   : 12/452159
DATED             : April 22, 2014
INVENTOR(S)       : Frank Jermann et al.

It is certified that error appears in the above-identified patent and that said Letters Patent is hereby corrected as shown below:

On the Title page, item (57) Abstract, Line 8:

delete "$(Sr_{1-x-y}Ba_xCa_y)$" and insert --$(Sr_{1-x-y}Ba_xCa_y)$--.

In the Claims,

Column 10, Lines 20-21, Claim 1, Lines 9-10:

delete "$(Sr_{1-x-y}Ba_xCa_y)$" and insert --$(Sr_{1-x-y}Ba_xCa_y)$--.

Signed and Sealed this
Seventeenth Day of February, 2015

Michelle K. Lee
*Deputy Director of the United States Patent and Trademark Office*